(No Model.)
H. S. MARINER.
TRAP.
No. 589,183. Patented Aug. 31, 1897.
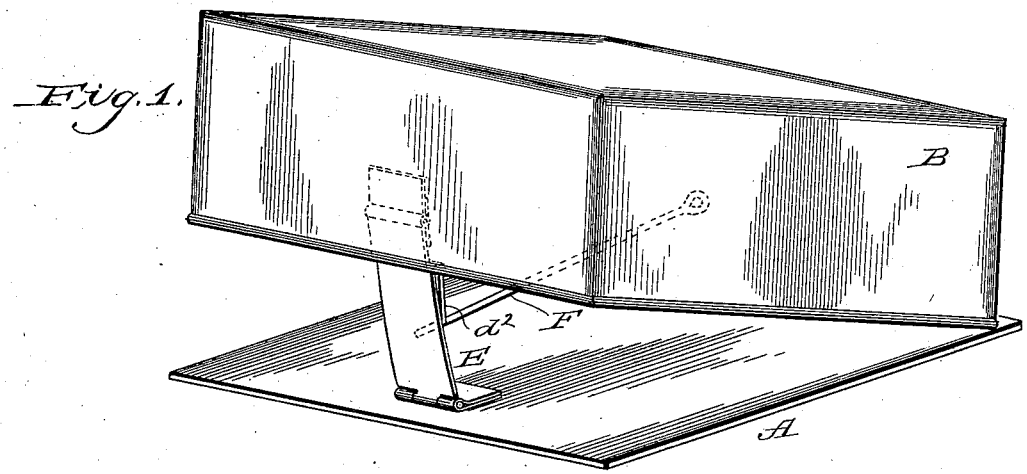
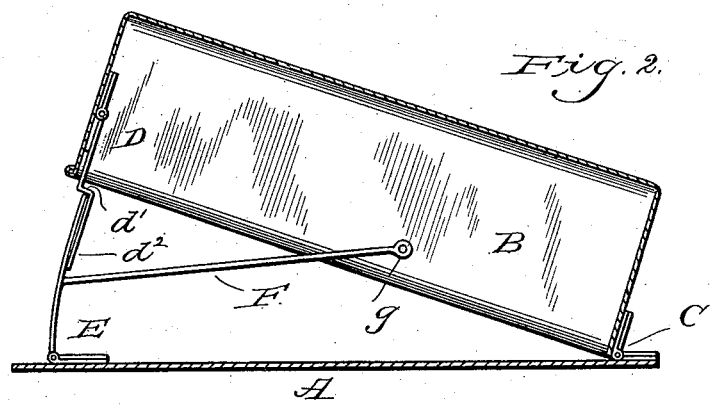
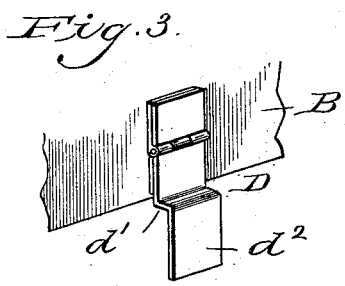
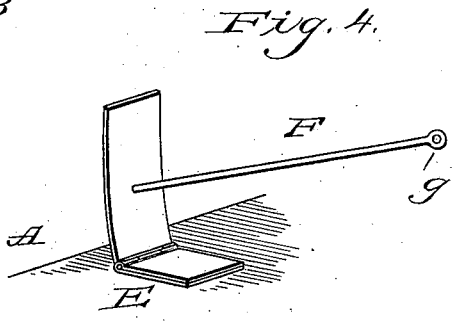
WITNESSES
Wm A. Schoenborn
C. D. Hesler
INVENTOR
Hethuly S. Mariner
by John Wedderburn
Attorney

United States Patent Office.

HETHERLY S. MARINER, OF AMESBURY, MASSACHUSETTS.

TRAP.

SPECIFICATION forming part of Letters Patent No. 589,183, dated August 31, 1897.

Application filed December 29, 1896. Serial No. 617,401. (No model.)

*To all whom it may concern:*

Be it known that I, HETHERLY S. MARINER, a citizen of the United States, residing at Amesbury, in the county of Essex and State of Massachusetts, have invented certain new and useful Improvements in Traps; and I do hereby declare the following to be a full, clear, and exact description of the invention, such as will enable others skilled in the art to which it appertains to make and use the same.

My invention relates to certain new and useful improvements in animal-traps, the object being to provide a simple and effective form of trap for capturing mice.

To this end my invention consists of a base having a hinged body, suitable catch connections to hold the hinged body suspended, and a trip-lever adapted to disengage the said catch connections and allow said body to drop, all arranged and operating substantially in the manner hereinafter described and claimed.

In the accompanying drawings, Figure 1 is a perspective view showing the trap set. Fig. 2 is a sectional side view of the trap thrown open. Fig. 3 is a detail perspective view of the hinged locking member on the body. Fig. 4 is a perspective view of the trip-lever and its locking member.

Referring to the drawings, the letter A designates a rectangular bottom or base, and B a rectangular body portion closed at the top and sides, but open at the bottom. This body portion is hinged at C to the said base.

The trap mechanism is adapted to hold the said body suspended in an inclined position, as shown in Fig. 1, and release said body upon a mouse touching the bait. Upon the inner front wall of the hinged body is a catch member D, one end of which is pivoted thereto. At the center this catch is bent to form a shoulder $d'$ and a depending tongue $d^2$.

The mechanism on the base comprises a second latch member E, pivoted to the said base at one end and provided on its inner face with a slightly-curved trip-rod F, whose free end has a loop or eye $g$, to which a string or hook may be connected on which the bait is suspended. This free end of the rod may be formed in such manner as to confine the bait without the aid of a string, if desired.

In setting the trap, as shown in Fig. 1, the upper end of the trip latch member E is placed under the shoulder $d'$ of the upper latch member D, so as to support the free end of the body in an inclined position. The curvature of the rod causes it to assume the upwardly-projecting position in order to afford space for suspending the bait below it.

In operation it will be seen that when a mouse nibbles or pulls at the bait the trip-rod will be pulled downward and the upper pivoted latch member D forced backward, causing the disengagement of the two latch members and consequent drop of the body B, which will confine the mouse.

My invention provides a simple, cheap, and effective construction of trap which operates instantly. The mechanism of this trap, unlike other mouse-traps, avoids "hard" or "easy" setting and friction between the parts.

Having thus described my invention, what I claim as new, and desire to secure by Letters Patent, is—

An animal-trap comprising a base, a gravity-operated body pivoted at one end thereto, a pivoted latch member on the body having a shoulder, a pivoted latch member on the base whose free end is adapted to engage said shoulder, and a trip-rod projecting from the inner face of the base latch member, the free end of said rod adapted to support the bait, substantially as described and for the purpose designated.

In testimony whereof I have signed this specification in the presence of two subscribing witnesses.

HETHERLY S. MARINER.

Witnesses:
CLARENCE W. PEASLEE,
JAMES R. GRAVES.